United States Patent
Su et al.

(10) Patent No.: US 8,664,870 B2
(45) Date of Patent: Mar. 4, 2014

(54) CASCODED CURRENT REGULATOR

(75) Inventors: Wei-Chuan Su, Taipei (TW); Pen-Li Chou, Taipei (TW); Yen-Hui Wang, Taipei (TW)

(73) Assignee: Immense Advance Technology, Corporation, Taipei (TW)

( * ) Notice: Subject to any disclaimer, the term of this patent is extended or adjusted under 35 U.S.C. 154(b) by 147 days.

(21) Appl. No.: 13/428,831

(22) Filed: Mar. 23, 2012

(65) Prior Publication Data

US 2013/0249423 A1   Sep. 26, 2013

(51) Int. Cl.
*H05B 41/14* (2006.01)
*H05B 39/00* (2006.01)
*H05B 37/00* (2006.01)

(52) U.S. Cl.
USPC ........ 315/201; 315/185 R; 315/193; 315/299; 315/301

(58) Field of Classification Search
None
See application file for complete search history.

(56) References Cited

U.S. PATENT DOCUMENTS

2011/0148314 A1* 6/2011 Lin et al. ......................... 315/192
2012/0313541 A1* 12/2012 Egawa et al. ................. 315/201

* cited by examiner

*Primary Examiner* — Anh Tran
(74) *Attorney, Agent, or Firm* — The Weintraub Group, Inc.

(57) ABSTRACT

A cascoded current regulator, including: a first load circuit, having a first load and a current source unit; and a second load circuit, being cascaded with the first load circuit and having a second load and a current mirror unit, wherein a first current flowing through the first load and a second current flowing through the current source unit are controlled by a control voltage, and a third current flowing through the second load and a fourth current flowing through the current mirror unit are generated according to the second current.

15 Claims, 5 Drawing Sheets

CASCODED CURRENT REGULATOR

BACKGROUND OF THE INVENTION

1. Field of the Invention

The present invention relates to a current regulator for LED lighting applications, especially to a cascoded current regulator for LED lighting applications.

2. Description of the Related Art

FIG. 1 illustrates a circuit diagram of a prior art LED lighting circuit. As illustrated in FIG. 1, the prior art LED lighting circuit includes a bridge rectifier 110, an amplifier 120, a current sensing resistor 130, an NMOS transistor 140, and a LED load 150.

The bridge rectifier 110 is used for rectifying an AC power $V_{AC}$ to generate a line voltage $V_{LINE}$.

The amplifier 120 is used for amplifying the difference of a reference voltage $V_{REF}$ and a feedback signal $V_{FB}$ to generate a gate signal $V_G$, wherein the reference voltage $V_{REF}$ is a DC voltage.

The current sensing resistor 130 is used for generating the feedback signal $V_{FB}$ in response to an output current $I_O$.

The NMOS transistor 140 is used for controlling the output current $I_O$ in response to the gate signal $V_G$—the higher the gate signal $V_G$, the larger the output current $I_O$.

The LED load 150, powered by the line voltage $V_{LINE}$, emits light according to the output current $I_O$—the larger the output current $I_O$, the higher the light intensity.

When in operation, the feedback signal $V_{FB}$ will be regulated at the reference voltage $V_{REF}$ due to a negative feedback mechanism of this circuit, and the drain-source voltage $V_{DS}$ of the NMOS transistor 140 will vary with the line voltage $V_{LINE}$ so as to keep the output current $I_O$ constant. However, when the line voltage $V_{LINE}$ is changed from the lowest level to the highest level of an allowed range—for example, the allowed range is 85V~135V, and the line voltage $V_{LINE}$ is changed from 85V to 135 V—of the prior art LED driver circuit, then the drain-source voltage $V_{DS}$ of the NMOS transistor 140 will increase by 50V, degrading the efficiency of power converted from the line voltage $V_{LINE}$ to the LED load 150, and a large amount of heat will be generated thereby. Besides, the NMOS transistor 140 will have to be manufactured by using a high voltage process.

To solve the foregoing problems, a novel current regulator is therefore needed.

SUMMARY OF THE INVENTION

One objective of the present invention is to disclose a cascoded current regulator, which is capable of using low voltage rating devices instead of a high voltage rating device.

Another objective of the present invention is to disclose a cascoded current regulator, which is capable of transmitting a current command through multiple circuit blocks in a stack.

Still another objective of the present invention is to disclose a cascoded current regulator, which is capable of providing an excellent power factor.

To attain the foregoing objectives, a cascoded current regulator is proposed, comprising:

a first load circuit, comprising:
a first load, including at least one light emitting diode; and
a current source unit, having a common terminal, a control terminal, a first connection terminal, and a second connection terminal, wherein the common terminal is coupled to a first voltage, the control terminal is coupled to a control voltage, and the first connection terminal is coupled to one end of the first load; and a second load circuit, comprising:
a second load, including at least one light emitting diode and having one end coupled to a first contact having a second voltage; and
a current mirror unit, having a third connection terminal, a fourth connection terminal, a fifth connection terminal, and a sixth connection terminal, wherein the third connection terminal is coupled to another end of the second load, the fourth connection terminal is coupled to a second contact having a third voltage, the fifth connection terminal is coupled to another end of the first load, and the sixth connection terminal is coupled to the second connection terminal;

wherein a first current flowing through the first connection terminal and a second current flowing through the second connection terminal are controlled by the control voltage, and a third current flowing through the third connection terminal and a fourth current flowing through the fourth connection terminal are generated according to the second current.

Preferably, the control voltage is proportional to a line voltage, which is a full-wave rectified voltage generated by performing a full-wave rectification on an AC power.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
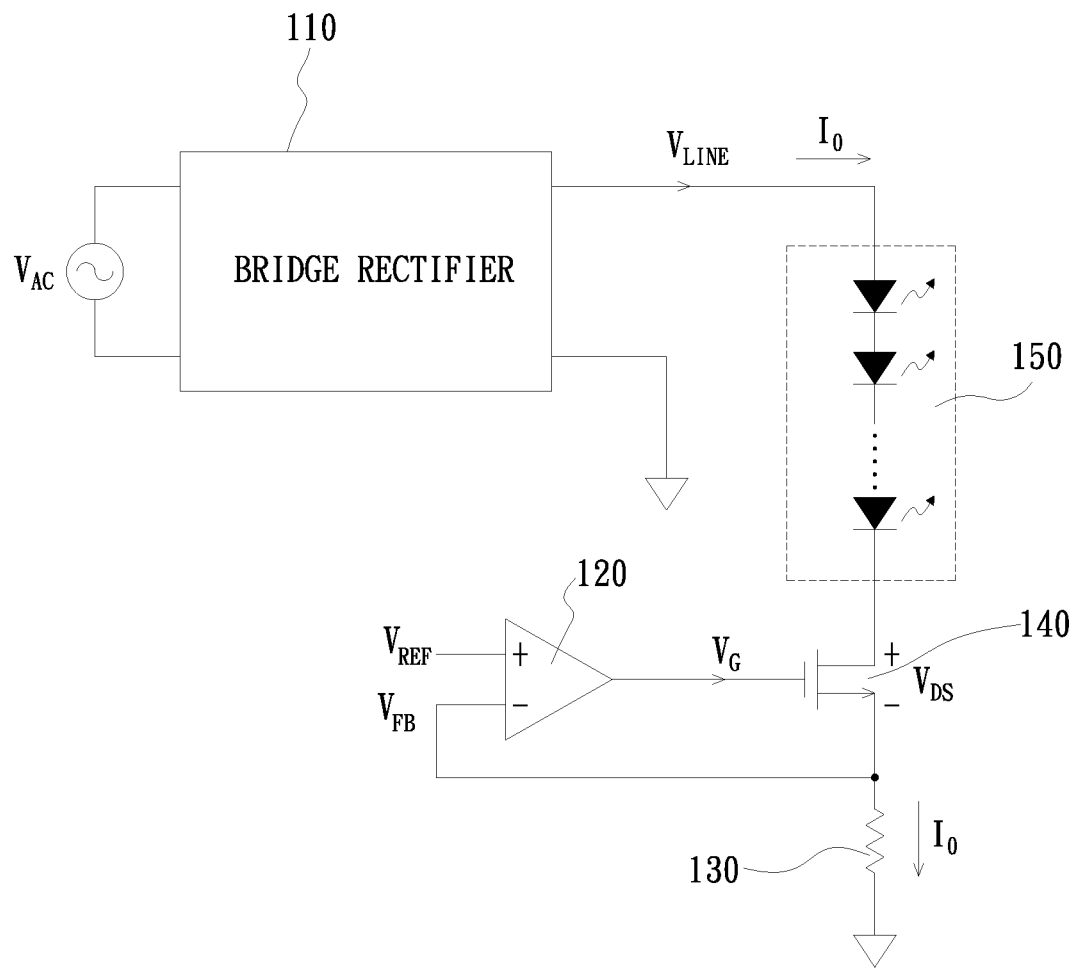
FIG. 1 illustrates a circuit diagram of a prior art LED lighting circuit.
Figure 2:
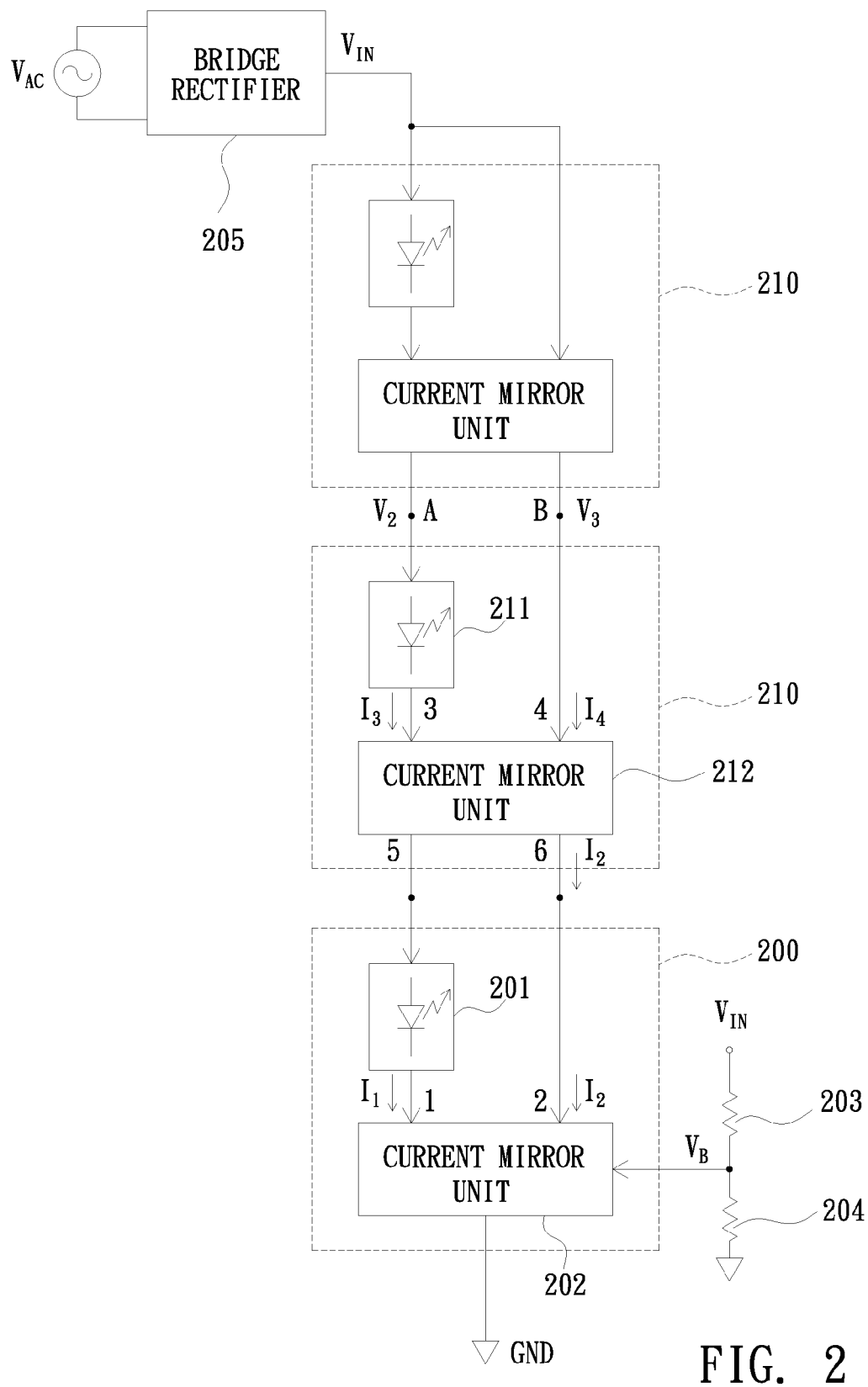
FIG. 2 illustrates a block diagram of a cascoded current regulator according to a preferred embodiment of the present invention.

Please refer to FIG. 2, which illustrates a block diagram of a cascoded current regulator according to a preferred embodiment of the present invention. As illustrated in FIG. 2, the cascoded current regulator includes a first load circuit 200, a resistor 203, a resistor 204, a bridge rectifier 205, and two second load circuits 210.

The first load circuit 200 includes a first load 201 and a current source unit 202. The first load 201 includes at least one light emitting diode. The current source unit 202 has a common terminal, a control terminal, a first connection terminal, and a second connection terminal, wherein the common terminal is coupled to a first voltage—a ground voltage in this embodiment, the control terminal is coupled to a control voltage $V_B$, and the first connection terminal is coupled to one end of the first load 201.

A first current $I_1$ flowing through the first connection terminal and a second current $I_2$ flowing through the second connection terminal are controlled by the control voltage $V_B$—the higher the control voltage $V_B$ is, the larger the first current $I_1$ and the second current $I_2$ will be. Preferably, the current source unit 202 uses two N type field effect transistors for generating the first current $I_1$ and the second current $I_2$ according to the control voltage $V_B$.

The resistor 203 and the resistor 204 are used for generating the control voltage $V_B$ by dividing a line voltage $V_{IN}$ with a resistance ratio.

The bridge rectifier 205 is used for generating the line voltage $V_{IN}$ by performing a full-wave rectification on an AC power.

The second load circuit 210 includes a second load 211 and a current mirror unit 212. The second load 211 includes at least one light emitting diode and has one end coupled to a first contact A having a second voltage $V_2$.

The current mirror unit 212 has a third connection terminal, a fourth connection terminal, a fifth connection terminal, and a sixth connection terminal, wherein the third connection terminal is coupled to another end of the second load 211, the fourth connection terminal is coupled to a second contact B having a third voltage $V_3$, the fifth connection terminal is coupled to another end of the first load 201, and the sixth connection terminal is coupled to the second connection terminal.

The second voltage $V_2$ and the third voltage $V_3$ can be generated by coupling the first contact A and the second contact B to the line voltage $V_{IN}$ via at least one circuit block connected in a stack, with each of the at least one circuit block having same architecture as the second load circuit 210. The number of the at least one circuit block depends on the amplitude of the line voltage $V_{IN}$—the higher the amplitude, the larger the number. In this embodiment, the second voltage $V_2$ and the third voltage $V_3$ is generated by coupling the first contact A and the second contact B to the line voltage $V_{IN}$ via one circuit block having same architecture as the second load circuit 210.

A third current $I_3$ flowing through the third connection terminal and a fourth current $I_4$ flowing through the fourth connection terminal are generated according to the second current $I_2$—the larger the second current $I_2$ is, the larger the third current $I_3$ and the fourth current $I_4$ will be. Preferably, the current mirror unit 212 uses a plurality of N type field effect transistors and a plurality of P type field effect transistors for generating the third current $I_3$ and the fourth current $I_4$ according to the second current $I_2$.

Figure 3:
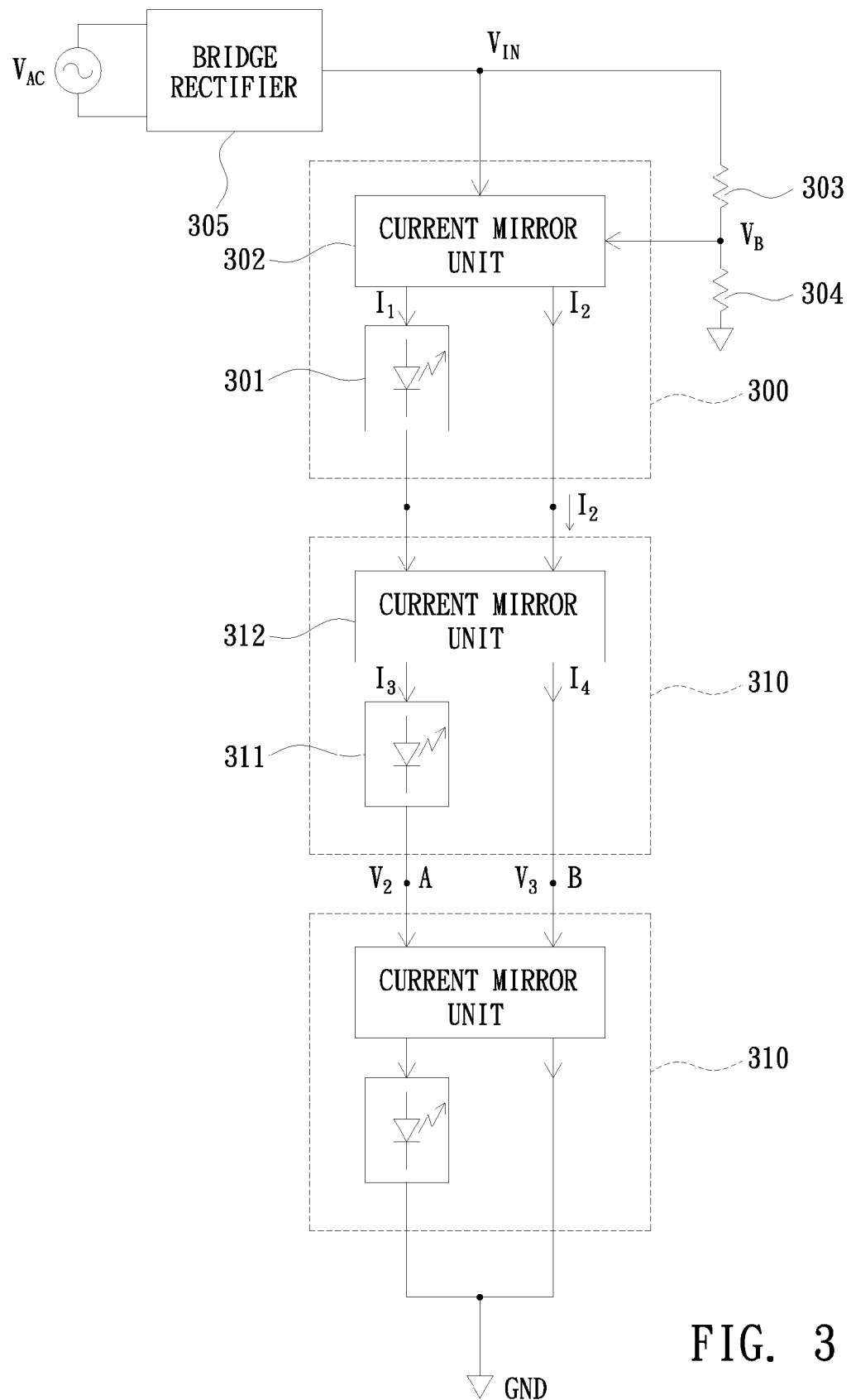
FIG. 3 illustrates a block diagram of a cascoded current regulator according to another preferred embodiment of the present invention.

Please refer to FIG. 3, which illustrates a block diagram of a cascoded current regulator according to another preferred embodiment of the present invention. As illustrated in FIG. 3, the cascoded current regulator includes a first load circuit 300, a resistor 303, a resistor 304, a bridge rectifier 305, and two second load circuits 310.

The first load circuit 300 includes a first load 301 and a current source unit 302. The first load 301 includes at least one light emitting diode. The current source unit 302 has a common terminal, a control terminal, a first connection terminal, and a second connection terminal, wherein the common terminal is coupled to a first voltage—a line voltage $V_{IN}$ in this embodiment, the control terminal is coupled to a control voltage $V_B$, and the first connection terminal is coupled to one end of the first load 301.

A first current $I_1$ flowing through the first connection terminal and a second current $I_2$ flowing through the second connection terminal are controlled by the control voltage $V_B$—the higher the control voltage $V_B$ is, the larger the first current $I_1$ and the second current $I_2$ will be. Preferably, the current source unit 302 includes two P type field effect transistors for generating the first current $I_1$ and the second current $I_2$ according to a voltage difference between the line voltage $V_{IN}$ and the control voltage $V_B$.

The resistor 303 and the resistor 304 are used for generating the control voltage $V_B$ by dividing the line voltage $V_{IN}$ with a resistance ratio.

The bridge rectifier 305 is used for generating the line voltage $V_{IN}$ by performing a full-wave rectification on an AC power.

The second load circuit 310 includes a second load 311 and a current mirror unit 312. The second load 311 includes at least one light emitting diode and has one end coupled to a first contact A having a second voltage $V_2$.

The current mirror unit 312 has a third connection terminal, a fourth connection terminal, a fifth connection terminal, and a sixth connection terminal, wherein the third connection terminal is coupled to another end of the second load 311, the fourth connection terminal is coupled to a second contact B having a third voltage $V_3$, the fifth connection terminal is coupled to another end of the first load 301, and the sixth connection terminal is coupled to the second connection terminal.

The second voltage $V_2$ and the third voltage $V_3$ can be generated by coupling the first contact A and the second contact B to a ground voltage via at least one circuit block connected in a stack, with each of the at least one circuit block having same architecture as the second load circuit 310. The number of the at least one circuit block depends on the amplitude of the line voltage $V_{IN}$—the higher the amplitude, the larger the number. In this embodiment, the second voltage $V_2$ and the third voltage $V_3$ is generated by coupling the first contact A and the second contact B to the ground voltage via one circuit block having same architecture as the second load circuit 210.

A third current $I_3$ flowing through the third connection terminal and a fourth current $I_4$ flowing through the fourth connection terminal are generated according to the second current $I_2$—the larger the second current $I_2$ is, the larger the third current $I_3$ and the fourth current $I_4$ will be. Preferably, the current mirror unit 312 uses a plurality of N type field effect transistors and a plurality of P type field effect transistors for generating the third current $I_3$ and the fourth current $I_4$ according to the second current $I_2$.

Figure 4:
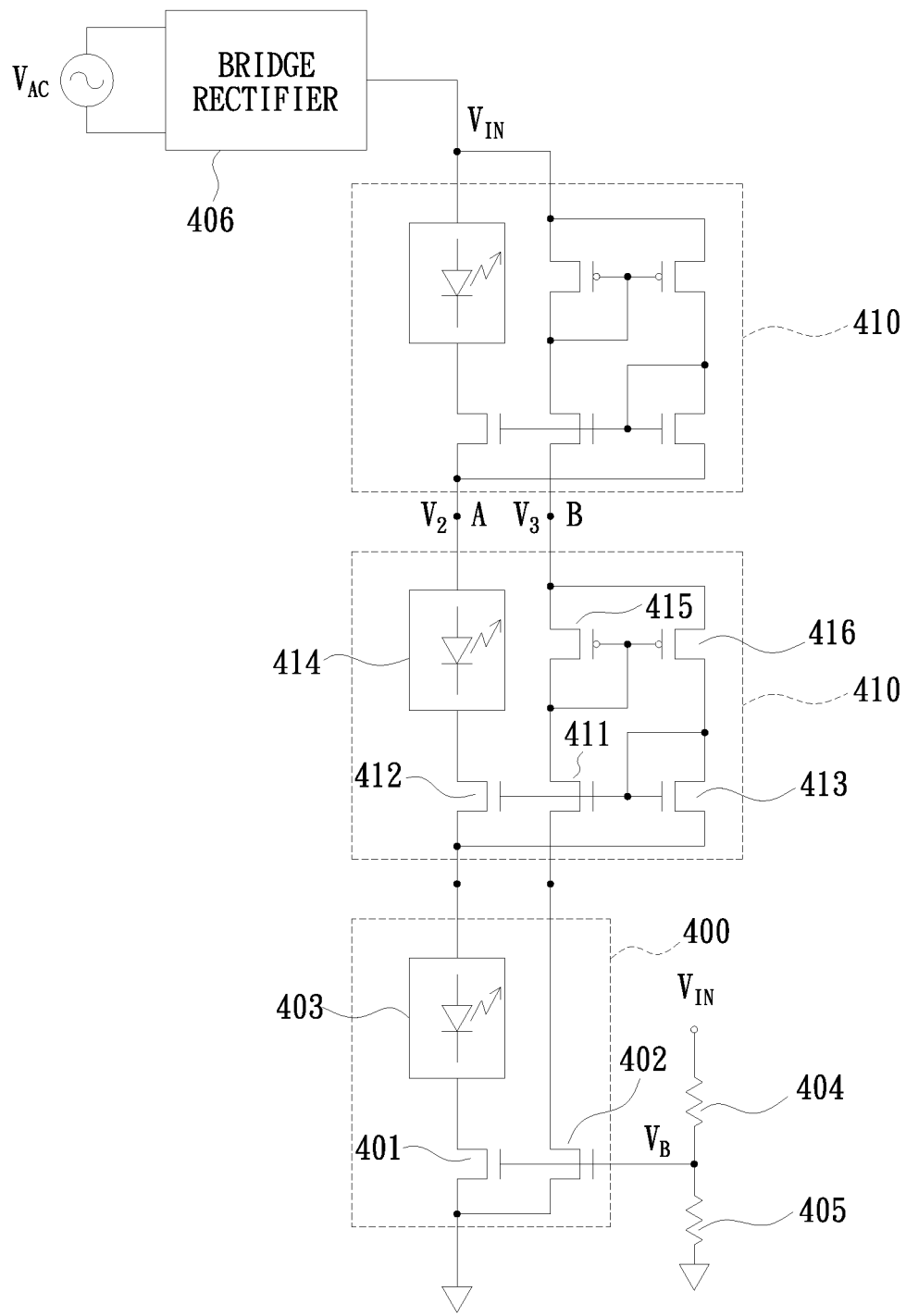
FIG. 4 illustrates a circuit diagram of a cascoded current regulator according to a preferred embodiment of the present invention.

Please refer to FIG. 4, which illustrates a circuit diagram of a cascoded current regulator according to a preferred embodiment of the present invention. As illustrated in FIG. 4, the cascoded current regulator includes a first load circuit 400, a resistor 404, a resistor 405, a bridge rectifier 406, and two second load circuits 410.

The first load circuit 400 includes a first N type field effect transistor 401, a second N type field effect transistor 402, and a first load 403.

The first N type field effect transistor 401 has a first gate terminal, a first drain terminal, and a first source terminal, wherein the first gate terminal is coupled to a control voltage $V_B$, and the first source terminal is coupled to a ground voltage.

The second N type field effect transistor 402 has a second gate terminal, a second drain terminal, and a second source terminal, wherein the second gate terminal is coupled to the control voltage $V_B$, and the second source terminal is coupled to the ground voltage.

The first load 403 includes at least one light emitting diode and has one end coupled to the first drain terminal.

A first current flowing through the first N type field effect transistor 401 and a second current flowing through the second N type field effect transistor 402 are controlled by the control voltage $V_B$—the higher the control voltage $V_B$ is, the larger the first current and the second current will be.

The resistor 404 and the resistor 405 are used for generating the control voltage $V_B$ by dividing a line voltage $V_{IN}$ with a resistance ratio.

The bridge rectifier 406 is used for generating the line voltage $V_{IN}$ by performing a full-wave rectification on an AC power.

The second load circuit 410 includes a third N type field effect transistor 411, a fourth N type field effect transistor 412, a fifth N type field effect transistor 413, a second load 414, a first P type field effect transistor 415, and a second P type field effect transistor 416.

The third N type field effect transistor 411 has a third gate terminal, a third drain terminal, and a third source terminal, wherein the third source terminal is coupled to the second drain terminal.

The fourth N type field effect transistor 412 has a fourth gate terminal, a fourth drain terminal, and a fourth source terminal, wherein the fourth gate terminal is coupled to the third gate terminal, the fourth source terminal is coupled to another end of the first load 403.

The fifth N type field effect transistor 413 has a fifth gate terminal, a fifth drain terminal, and a fifth source terminal, wherein the fifth gate terminal is coupled to both the third gate terminal and the fifth drain terminal, and the fifth source terminal is coupled to the fourth source terminal.

The second load 414 includes at least one light emitting diode and has one end coupled to the fourth drain terminal, and another end coupled to a first contact A having a second voltage $V_2$, the second voltage $V_2$ being higher than the ground voltage.

The first P type field effect transistor 415 has a sixth gate terminal, a sixth drain terminal, and a sixth source terminal, wherein the sixth gate terminal is coupled to the sixth drain terminal and the third drain terminal, and the sixth source terminal is coupled to a second contact B having a third voltage $V_3$, the third voltage $V_3$ being higher than the ground voltage.

The second P type field effect transistor 416 has a seventh gate terminal, a seventh drain terminal, and a seventh source terminal, wherein the seventh gate terminal is coupled to the sixth gate terminal, the seventh drain terminal is coupled to the fifth drain terminal, and the seventh source terminal is coupled to the sixth source terminal.

A third current flowing through the first contact A and a fourth current flowing through the second contact B are generated according to the second current—the larger the second current is, the larger the third current and the fourth current will be.

Figure 5:
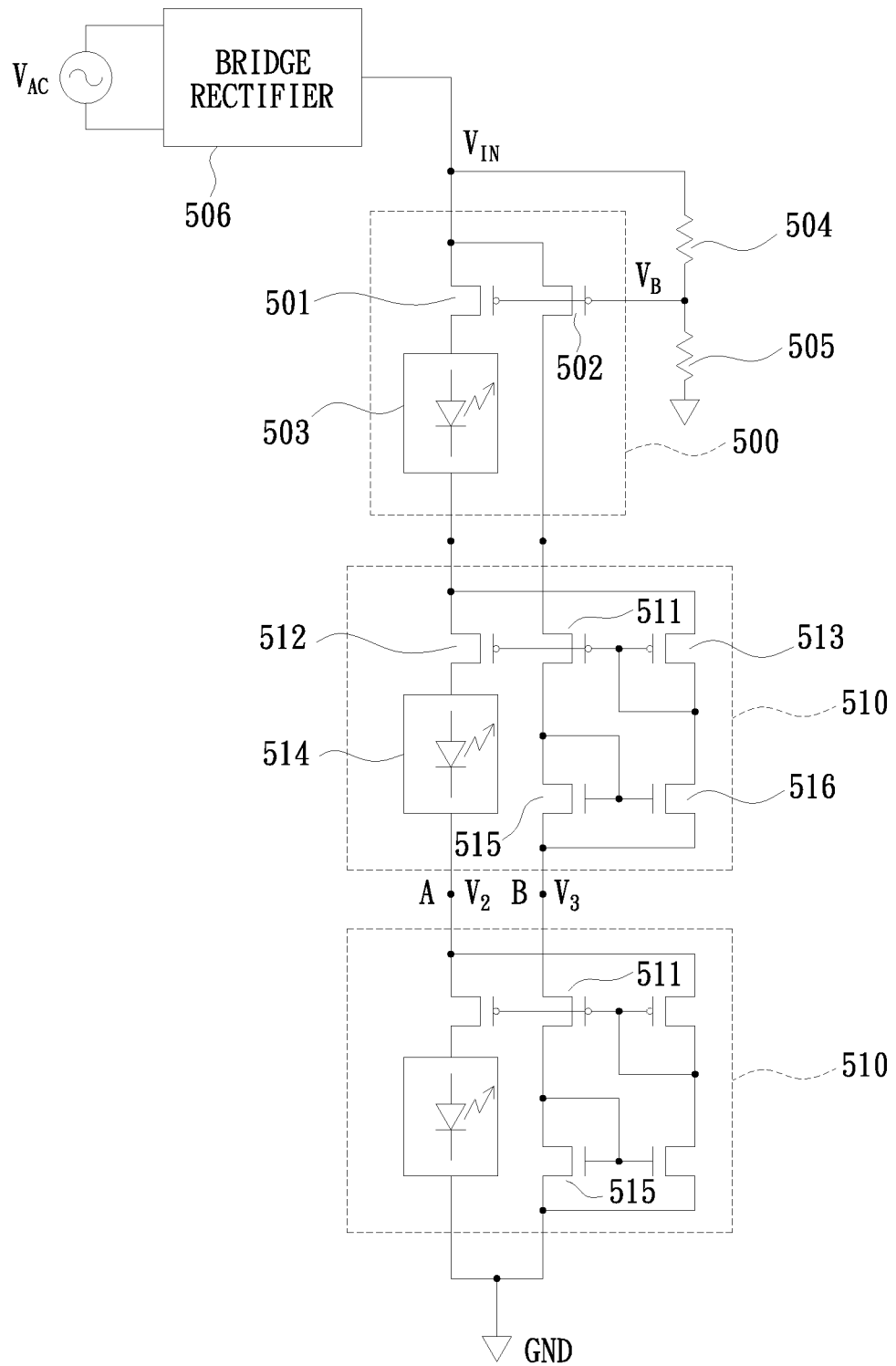
FIG. 5 illustrates a circuit diagram of a cascoded current regulator according to another preferred embodiment of the present invention.

Please refer to FIG. 5, which illustrates a circuit diagram of a cascoded current regulator according to another preferred embodiment of the present invention. As illustrated in FIG. 5, the cascoded current regulator includes a first load circuit 500, a resistor 504, a resistor 505, a bridge rectifier 506, and two second load circuits 510.

The first load circuit 500 includes a first P type field effect transistor 501, a second P type field effect transistor 502, and a first load 503.

The first P type field effect transistor 501 has a first gate terminal, a first drain terminal, and a first source terminal, wherein the first gate terminal is coupled to a control voltage $V_B$, and the first source terminal is coupled to a line voltage $V_{IN}$, which is a full-wave rectified voltage generated by performing a full-wave rectification on an AC power.

The second P type field effect transistor 502 has a second gate terminal, a second drain terminal, and a second source terminal, wherein the second gate terminal is coupled to the control voltage $V_B$, and the second source terminal is coupled to the line voltage $V_{IN}$.

The first load 503 includes at least one light emitting diode and has one end coupled to the first drain terminal.

A first current flowing through the first P type field effect transistor 501 and a second current flowing through the second P type field effect transistor 502 are controlled by the control voltage $V_B$—the higher the control voltage $V_B$ is, the larger the first current and the second current will be. The reason is due to a fact that the first current and the second current increase with a source-gate voltage ($=V_{IN}-V_B=((1+\gamma)V_B-V_B)=\gamma V_B$, wherein $\gamma$ is the resistance ratio between the resistor 504 and the resistor 505).

The resistor 504 and the resistor 505 are used for generating the control voltage $V_B$ by dividing the line voltage $V_{IN}$ with a resistance ratio.

The bridge rectifier 506 is used for generating the line voltage $V_{IN}$ by performing a full-wave rectification on an AC power.

The second load circuit 510 includes a third P type field effect transistor 511, a fourth P type field effect transistor 512, a fifth P type field effect transistor 513, a second load 514, a first N type field effect transistor 515, and a second N type field effect transistor 516.

The third P type field effect transistor 511 has a third gate terminal, a third drain terminal, and a third source terminal, wherein the third source terminal is coupled to the second drain terminal.

The fourth P type field effect transistor 512 has a fourth gate terminal, a fourth drain terminal, and a fourth source terminal, wherein the fourth gate terminal is coupled to the third gate terminal, the fourth source terminal is coupled to another end of the first load 503.

The fifth P type field effect transistor 513 has a fifth gate terminal, a fifth drain terminal, and a fifth source terminal, wherein the fifth gate terminal is coupled to both the third gate terminal and the fifth drain terminal, and the fifth source terminal is coupled to the fourth source terminal.

The second load 514 includes at least one light emitting diode and has one end coupled to the fourth drain terminal, and another end coupled to a first contact A having a second voltage $V_2$, the second voltage $V_2$ being lower than the line voltage $V_{IN}$.

The first N type field effect transistor 515 has a sixth gate terminal, a sixth drain terminal, and a sixth source terminal, wherein the sixth gate terminal is coupled to the sixth drain terminal and the third drain terminal, and the sixth source terminal is coupled to a second contact B having a third voltage $V_3$, the third voltage $V_3$ being lower than the line voltage $V_{IN}$.

The second N type field effect transistor 516 has a seventh gate terminal, a seventh drain terminal, and a seventh source terminal, wherein the seventh gate terminal is coupled to the sixth gate terminal, the seventh drain terminal is coupled to the fifth drain terminal, and the seventh source terminal is coupled to the sixth source terminal.

A third current flowing through the first contact A and a fourth current flowing through the second contact B are generated according to the second current—the larger the second current is, the larger the third current and the fourth current will be.

In conclusion, the present invention possesses the advantages as follows:

1. The cascoded current regulator of the present invention can use low voltage rating devices instead of a high voltage rating device to reduce cost.

2. The cascoded current regulator of the present invention can cleverly transmit a current command through multiple circuit blocks in a stack.

3. The cascoded current regulator of the present invention can provide an excellent power factor by determining a first current and a second current according to a control voltage, which is proportional to a line voltage having a full-wave rectified waveform.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A cascoded current regulator, comprising:
   a first load circuit, comprising:
   a first load, including at least one light emitting diode; and
   a current source unit, having a common terminal, a control terminal, a first connection terminal, and a second connection terminal, wherein said common terminal is coupled to a first voltage, said control terminal is coupled to a control voltage, and said first connection terminal is coupled to one end of said first load; and
   a second load circuit, comprising:
   a second load, including at least one light emitting diode and having one end coupled to a first contact having a second voltage; and
   a current mirror unit, having a third connection terminal, a fourth connection terminal, a fifth connection terminal, and a sixth connection terminal, wherein said third connection terminal is coupled to another end of said second load, said fourth connection terminal is coupled to a second contact having a third voltage, said fifth connection terminal is coupled to another end of said first load, and said sixth connection terminal is coupled to said second connection terminal;
   wherein a first current flowing through said first connection terminal and a second current flowing through said second connection terminal are controlled by said control voltage, and a third current flowing through said third connection terminal and a fourth current flowing through said fourth connection terminal are generated according to said second current.

2. The cascoded current regulator as claim 1, wherein said first voltage is a ground voltage, and said control voltage is proportional to a line voltage, which is a full-wave rectified voltage generated by performing a full-wave rectification on an AC power.

3. The cascoded current regulator as claim 1, wherein said first voltage is a line voltage, which is a full-wave rectified voltage generated by performing a full-wave rectification on an AC power, and said control voltage is proportional to said line voltage.

4. The cascoded current regulator as disclosed in claim 2, wherein said current source unit includes two N type field effect transistors for generating said first current and said second current under the control of said control voltage.

5. The cascoded current regulator as disclosed in claim 3, wherein said current source unit includes two P type field effect transistors for generating said first current and said second current under the control of said control voltage.

6. The cascoded current regulator as disclosed in claim 4, wherein said current mirror unit includes a plurality of N type field effect transistors and a plurality of P type field effect transistors for generating said third current and said fourth current according to said second current.

7. The cascoded current regulator as disclosed in claim 5, wherein said current mirror unit includes a plurality of N type field effect transistors and a plurality of P type field effect transistors for generating said third current and said fourth current according to said second current.

8. The cascoded current regulator as disclosed in claim 2, wherein said second voltage and said third voltage are generated by coupling said first contact and said second contact to said line voltage via at least one circuit block connected in a stack, wherein each of said at least one circuit block has same architecture as said second load circuit.

9. The cascoded current regulator as disclosed in claim 3, wherein said second voltage and said third voltage are generated by coupling said first contact and said second contact to a ground voltage via at least one circuit block connected in a stack, wherein each of said at least one circuit block has same architecture as said second load circuit.

10. A cascoded current regulator, comprising:
    a first load circuit, comprising:
    a first N type field effect transistor, having a first gate terminal, a first drain terminal, and a first source terminal, wherein said first gate terminal is coupled to a control voltage, and said first source terminal is coupled to a ground voltage;
    a second N type field effect transistor, having a second gate terminal, a second drain terminal, and a second source terminal, wherein said second gate terminal is coupled to said control voltage, and said second source terminal is coupled to said ground voltage; and
    a first load, which includes at least one light emitting diode and has one end coupled to said first drain terminal; and
    a second load circuit, comprising:
    a third N type field effect transistor, having a third gate terminal, a third drain terminal, and a third source terminal, wherein said third source terminal is coupled to said second drain terminal;
    a fourth N type field effect transistor, having a fourth gate terminal, a fourth drain terminal, and a fourth source terminal, wherein said fourth gate terminal is coupled to said third gate terminal, said fourth source terminal is coupled to another end of said first load;
    a fifth N type field effect transistor, having a fifth gate terminal, a fifth drain terminal, and a fifth source terminal, wherein said fifth gate terminal is coupled to both said third gate terminal and said fifth drain terminal, and said fifth source terminal is coupled to said fourth source terminal;
    a second load, which includes at least one light emitting diode and has one end coupled to said fourth drain terminal, and another end coupled to a first contact having a second voltage, said second voltage being higher than said ground voltage;
    a first P type field effect transistor, having a sixth gate terminal, a sixth drain terminal, and a sixth source terminal, wherein said sixth gate terminal is coupled to said sixth drain terminal and said third drain terminal, and said sixth source terminal is coupled to a second contact having a third voltage, said third voltage being higher than said ground voltage; and a second P type field effect transistor, having a seventh gate terminal, a seventh drain terminal, and a seventh source terminal, wherein said seventh gate terminal is coupled to said sixth gate terminal, said seventh drain terminal is coupled to said fifth drain terminal, and said seventh source terminal is coupled to said sixth source terminal.

11. The cascoded current regulator as claim 10, wherein said control voltage is proportional to a line voltage, which is a full-wave rectified voltage generated by performing a full-wave rectification on an AC power.

12. The cascoded current regulator as disclosed in claim 11, wherein said second voltage and said third voltage are generated by coupling said first contact and said second contact to said line voltage via at least one circuit block connected in a stack, wherein each of said at least one circuit block has same architecture as said second load circuit.

13. A cascoded current regulator, comprising:
a first load circuit, comprising:
a first P type field effect transistor, having a first gate terminal, a first drain terminal, and a first source terminal, wherein said first gate terminal is coupled to a control voltage, and said first source terminal is coupled to a line voltage, which is a full-wave rectified voltage generated by performing a full-wave rectification on an AC power;
a second P type field effect transistor, having a second gate terminal, a second drain terminal, and a second source terminal, wherein said second gate terminal is coupled to said control voltage, and said second source terminal is coupled to said line voltage; and
a first load, which includes at least one light emitting diode and has one end coupled to said first drain terminal; and
a second load circuit, comprising:
a third P type field effect transistor, having a third gate terminal, a third drain terminal, and a third source terminal, wherein said third source terminal is coupled to said second drain terminal;
a fourth P type field effect transistor, having a fourth gate terminal, a fourth drain terminal, and a fourth source terminal, wherein said fourth gate terminal is coupled to said third gate terminal, said fourth source terminal is coupled to another end of said first load;
a fifth P type field effect transistor, having a fifth gate terminal, a fifth drain terminal, and a fifth source terminal, wherein said fifth gate terminal is coupled to both said third gate terminal and said fifth drain terminal, and said fifth source terminal is coupled to said fourth source terminal;
a second load, which includes at least one light emitting diode and has one end coupled to said fourth drain terminal, and another end coupled to a first contact having a second voltage, said second voltage being lower than said line voltage;
a first N type field effect transistor, having a sixth gate terminal, a sixth drain terminal, and a sixth source terminal, wherein said sixth gate terminal is coupled to said sixth drain terminal and said third drain terminal, and said sixth source terminal is coupled to a second contact having a third voltage, said third voltage being lower than said line voltage; and
a second N type field effect transistor, having a seventh gate terminal, a seventh drain terminal, and a seventh source terminal, wherein said seventh gate terminal is coupled to said sixth gate terminal, said seventh drain terminal is coupled to said fifth drain terminal, and said seventh source terminal is coupled to said sixth source terminal.

14. The cascoded current regulator as claim 13, wherein said control voltage is proportional to said line voltage.

15. The cascoded current regulator as disclosed in claim 14, wherein said second voltage and said third voltage are generated by coupling said first contact and said second contact to a ground voltage via at least one circuit block connected in a stack, wherein each of said at least one circuit block has same architecture as said second load circuit.

* * * * *